US012725273B2

(12) United States Patent
Zhang et al.

(10) Patent No.: US 12,725,273 B2
(45) Date of Patent: Sep. 1, 2026

(54) SYSTEM AND METHOD FOR MAP VECTORIZATION IN ADVANCED DRIVING ASSISTANCE SYSTEM

(71) Applicant: Black Sesame Technologies Inc., San Jose, CA (US)

(72) Inventors: Gongjie Zhang, Singapore (SG); Shuang Wu, Singapore (SG); Jiahao Lin, Singapore (SG); Yilin Song, Santa Clara, CA (US); Zuoguan Wang, Santa Clara, CA (US)

(73) Assignee: BLACK SESAME TECHNOLOGIES, INC., San Jose, CA (US)

( * ) Notice: Subject to any disclaimer, the term of this patent is extended or adjusted under 35 U.S.C. 154(b) by 211 days.

(21) Appl. No.: 18/669,270

(22) Filed: May 20, 2024

(65) Prior Publication Data

US 2024/0404074 A1 Dec. 5, 2024

Related U.S. Application Data

(60) Provisional application No. 63/471,228, filed on Jun. 5, 2023.

(51) Int. Cl.

*G06T 7/194* (2017.01)
*G06T 5/70* (2024.01)
*G06V 10/44* (2022.01)

(52) U.S. Cl.

CPC ................ *G06T 7/194* (2017.01); *G06T 5/70* (2024.01); *G06V 10/44* (2022.01); *G06T 2207/20084* (2013.01); *G06T 2207/30252* (2013.01)

(58) Field of Classification Search

CPC .................... G06V 20/56; G06V 10/82; G06T 2207/30252; G06T 17/05; G06T 7/11;

(Continued)

(56) References Cited

U.S. PATENT DOCUMENTS

2021/0303763 A1 * 9/2021 Hartfiel .................... G06N 3/09

OTHER PUBLICATIONS

T. Fujimoto, S. Tanaka and S. Kato, "LaneFusion: 3D Object Detection with Rasterized Lane Map," 2022 IEEE Intelligent Vehicles Symposium (IV), Aachen, Germany, 2022, pp. 396-403, doi: 10.1109/IV51971.2022.9827025 (Year: 2022).*

* cited by examiner

*Primary Examiner* — Matthew C Bella
*Assistant Examiner* — Janice E. Vaz
(74) *Attorney, Agent, or Firm* — Shun Yao; Yao Legal Services, Inc

(57) ABSTRACT

One embodiment provides a system and method for generating vectorized maps. During operation, the system can obtain labeled training samples comprising images and vectorized ground truth information associated with the images. The system can generate, based on a machine learning model, a prediction output for each training sample, the prediction output comprising a vectorized map. The system can apply a differentiable rasterization technique to a vectorized map element within the vectorized map to obtain a segmentation mask, apply the differentiable rasterization technique to the vectorized ground truth information associated with the vectorized map element to obtain a ground truth segmentation mask, compute a segmentation loss function based on the segmentation mask and the ground truth mask, and update the machine learning model based on the segmentation loss function, thereby facilitating optimized generation of vectorized maps.

20 Claims, 5 Drawing Sheets

(58) Field of Classification Search
CPC ........... G06T 7/194; G06T 2207/20081; G06T 2207/20084; G06N 3/08; G06N 3/0464
See application file for complete search history.

SYSTEM AND METHOD FOR MAP VECTORIZATION IN ADVANCED DRIVING ASSISTANCE SYSTEM

This claims the benefit of U.S. Provisional Patent Application No. 63/471,228, entitled "Online Map Vectorization for Autonomous Driving: A Rasterization Perspective," by inventors Gongjie Zhang, Shuang Wu, Jiahao Lin, Yilin Song, and Zuoguan Wang, filed 5 Jun. 2023, the disclosure of which is incorporated herein by reference in its entirety for all purposes.

FIELD

This disclosure generally relates to autonomous driving. More specifically, the disclosed system and method relate to training a machine learning model for map vectorization based on differentiable rasterization.

RELATED ART

Online high-definition (HD) map construction is essential for autonomous driving because it can provide real-time and comprehensive information about the vehicle's surroundings and serve as the foundation for the vehicle's navigation, planning, and decision-making process. Existing online HD map construction approaches can fall into two categories: map rasterization and map vectorization.

The map rasterization approach models the HD map construction as a segmentation task that rasterizes the surroundings into semantic maps. However, rasterized maps lack instance-level and structural information and are not ideal for autonomous driving applications. Rasterized maps may require extensive post-processing before they can be used by subsequent navigation and decision-making modules. To address the limitations of the map rasterization approach, map vectorization approaches have been used to group pixels from rasterized maps into vectors to generate vectorized maps that can be easily understood by the navigation and decision-making modules. A vectorized map can include a digital representation of the environment in which an autonomous vehicle operates, where geographic features, road networks, and relevant information are encoded as vectors. These vectors can include geometric primitives such as points, lines (or polylines), and polygons, along with attributes such as road types, lane markings, traffic signs, and speed limits. These instance-level vectorized map elements are better suitable for autonomous driving systems.

Existing map vectorization approaches use a sparse point set representation, where each map element is parameterized as a fixed-length vector of equidistantly sampled points, with L1 loss applied to supervise regression predictions. While being simple and intuitive, such approaches are suboptimal. First, the sparse point set representation lacks precision (especially when dealing with sharp bends or complex details of map structures) and may result in significant parameterization errors. Second, learning with equidistant points as regression targets may cause ambiguous supervision because the intermediate points often lack clear visual clues. Third, relying solely on the L1 loss for regression supervision may cause the model to overlook fine-grained geometric variations, yielding overly smooth predictions that are insensitive to local deviations.

Moreover, existing map vectorization approaches typically require designing different representations for different types of map elements, which can be inflexible and are subject to many constraints. For example, one existing approach denotes lanes as a set of anchor points at fixed y-positions, which cannot be generalized to stop lines that are usually vertical to the y-axis. It also fails to represent U-shaped lanes, as there would be two x values for one y position. Another existing approach treats all elements in the map as equidistant points, which may not be efficient and accurate enough for real-time systems. The limitations of the existing approaches result in inaccurate and inefficient vectorized map generation, which can lead to suboptimal performance in advanced driver assistance systems (ADAS) and autonomous driving.

SUMMARY

One embodiment provides a system and method for generating vectorized maps. During operation, the system can obtain labeled training samples comprising images and vectorized ground truth information associated with the images. The system can generate, based on a machine learning model, a prediction output for each training sample, the prediction output comprising a vectorized map. The system can apply a differentiable rasterization technique to a vectorized map element within the vectorized map to obtain a segmentation mask, apply the differentiable rasterization technique to the vectorized ground truth information associated with the vectorized map element to obtain a ground truth segmentation mask, compute a segmentation loss function based on the segmentation mask and the ground truth mask, and update the machine learning model based on the segmentation loss function, thereby facilitating optimized generation of vectorized maps.

In a variation on this embodiment, the images can include multi-view images captured by multiple cameras mounted at different locations on a vehicle.

In a further variation, the system can extract Bird's Eye View (BEV) features from the multi-view images.

In a variation on this embodiment, the machine learning model can include a map-vectorization model based on a residual neural network (ResNet).

In a variation on this embodiment, applying the differentiable rasterization technique to the vectorized map element can include, in response to determining that the vectorized map element is a polyline, computing the segmentation mask based on an exponential or sigmoid function associated with distances between pixels and the polyline.

In a variation on this embodiment, applying the differentiable rasterization technique to the vectorized map element can include, in response to determining that the vectorized map element is a polygon, computing the segmentation mask based on a sigmoid function associated with distances between pixels and an edge of the polygon and foreground-background indicators of the pixels.

In a variation on this embodiment, applying the differentiable rasterization technique can further include adjusting a softness factor to control smoothness of the differentiable rasterization.

In a variation on this embodiment, the predicted vectorized map element can include a set of ordered points.

In a further variation, the system can compute a direction regularization loss function based on direction changes between adjacent pairs of points in the set of ordered points.

DESCRIPTION OF THE FIGURES

In the figures, like reference numerals refer to the same figure elements.

DETAILED DESCRIPTION

The following description is presented to enable any person skilled in the art to make and use the disclosed embodiments and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

Overview

This disclosure describes a system and method for generating accurate vectorized maps for autonomous driving applications. The proposed solution aims to generate vectorized maps using a deep-learning machine learning model (e.g., a neural network) based on the Bird's-Eye-View (BEV) framework. The BEV-based model can implement a compact and unified representation of various vectorized map elements, where each map element can be represented using an ordered point set and all elements categorized into a limited number of classes (e.g., polylines, polygons, etc.). To enable the model to effectively learn such a unified representation, differentiable rasterization can be applied on predicted ordered point sets during training to transform each vectorized map element into a rasterized HD mask. Moreover, segmentation supervision can be applied to the rasterized map, thus providing more granular supervision on the shape and geometry of the map elements. The seamless combination of differentiable rasterization and map vectorization can improve the precision of map vectorization and demonstrate robust scalability for diverse map elements. The disclosed solution incurs no extra computational overhead during inference.

Map Vectorization Via Rasterization

In autonomous driving, Bird's-Eye-View (BEV) representations of traffic scenes have become a popular solution due to their efficacy in different parts of the automated driving pipeline. It can extract a holistic representation of the environment from multi-camera images and depict the scene from the viewpoint of a downward-facing virtual orthographic camera above the ego vehicle. A typical BEV representation of a scene can include six images captured by cameras installed at different locations (e.g., the front, back, and sides) of the ego vehicle.

Figure 1A:
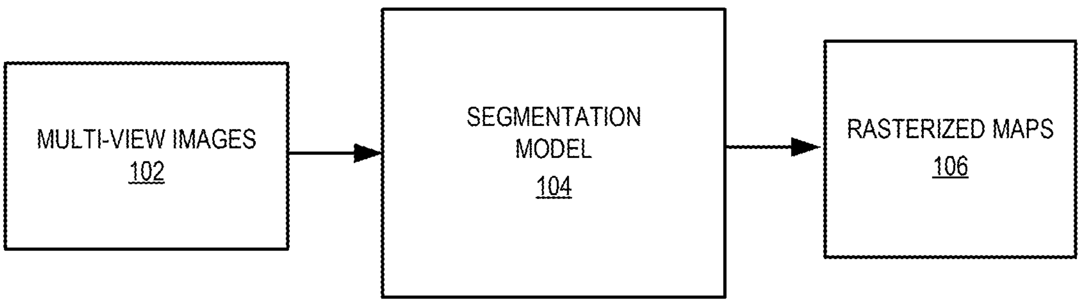
FIG. 1A illustrates the conventional map rasterization approach based on the Bird's-Eye-View (BEV) framework, according to prior art.

FIG. 1A illustrates a conventional map rasterization approach based on the Bird's-Eye-View (BEV) framework, according to prior art. In this example, multi-view images 102 can be inputted to a BEV-based segmentation model 104, which can perform semantic segmentation to output rasterized maps 106. Although sensitive to details, the rasterized maps lack instance-level information and lane topology, which may limit their usage in downstream tasks like navigation and planning.

Figure 1B:
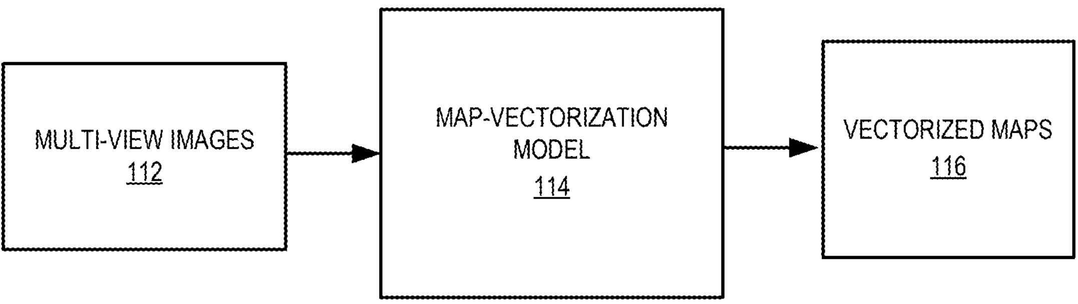
FIG. 1B illustrates the conventional map vectorization approach based on the Bird's-Eye-View (BEV) framework, according to prior art.

FIG. 1B illustrates a conventional map vectorization approach based on the Bird's-Eye-View (BEV) framework, according to prior art. In this example, multi-view images 112 can be inputted to a BEV-based map-vectorization model 114, which can predict map elements as vectorized point sets through regression to generate vectorized maps 116. Compared to rasterized maps, vectorized maps are more suitable for downstream tasks. However, vectorized maps generated by existing map vectorization approaches often exhibit minor deviations that can be critical in autonomous driving, where safety is of utmost importance.

To overcome the limitations of existing systems, in some embodiments of the instant application, a map vectorization via rasterization (MapVR) system can be used to generate vectorized maps. The MapVR system can combine differentiable rasterization with map vectorization to leverage the fine-grained supervisory signal from the rasterized HD maps while retaining the benefits of vectorized representation.

In vectorized maps, some elements (e.g., lanes, curbsides, and stop lines) can be represented or vectorized as polylines, whereas some map elements (e.g., crosswalks, road paths, and parking spaces) can be represented or vectorized as polygons. Note that a polyline is a continuous line composed of one or more connected straight line segments. Within the MapVR framework, an ordered point set can be used to represent both polylines and polygons, thus providing a more flexible and efficient way to encode complex shapes than prior approaches. In some embodiments, each and every map element can be presented as a set of ordered points with a predetermined number of points. In one example, each map element can be represented using a set of 20 ordered points. The set of ordered points can also have fewer (e.g., 15) or more (e.g., 30) points.

This ordered-point representation scheme is compact and suitable for practical applications. For example, deep learning-based models (e.g., neural networks) can directly regress the coordinates of the ordered points. Moreover, this scheme does not make strong assumptions about the shapes of the elements and thus can be used flexibly for various types of map elements.

Figure 2:
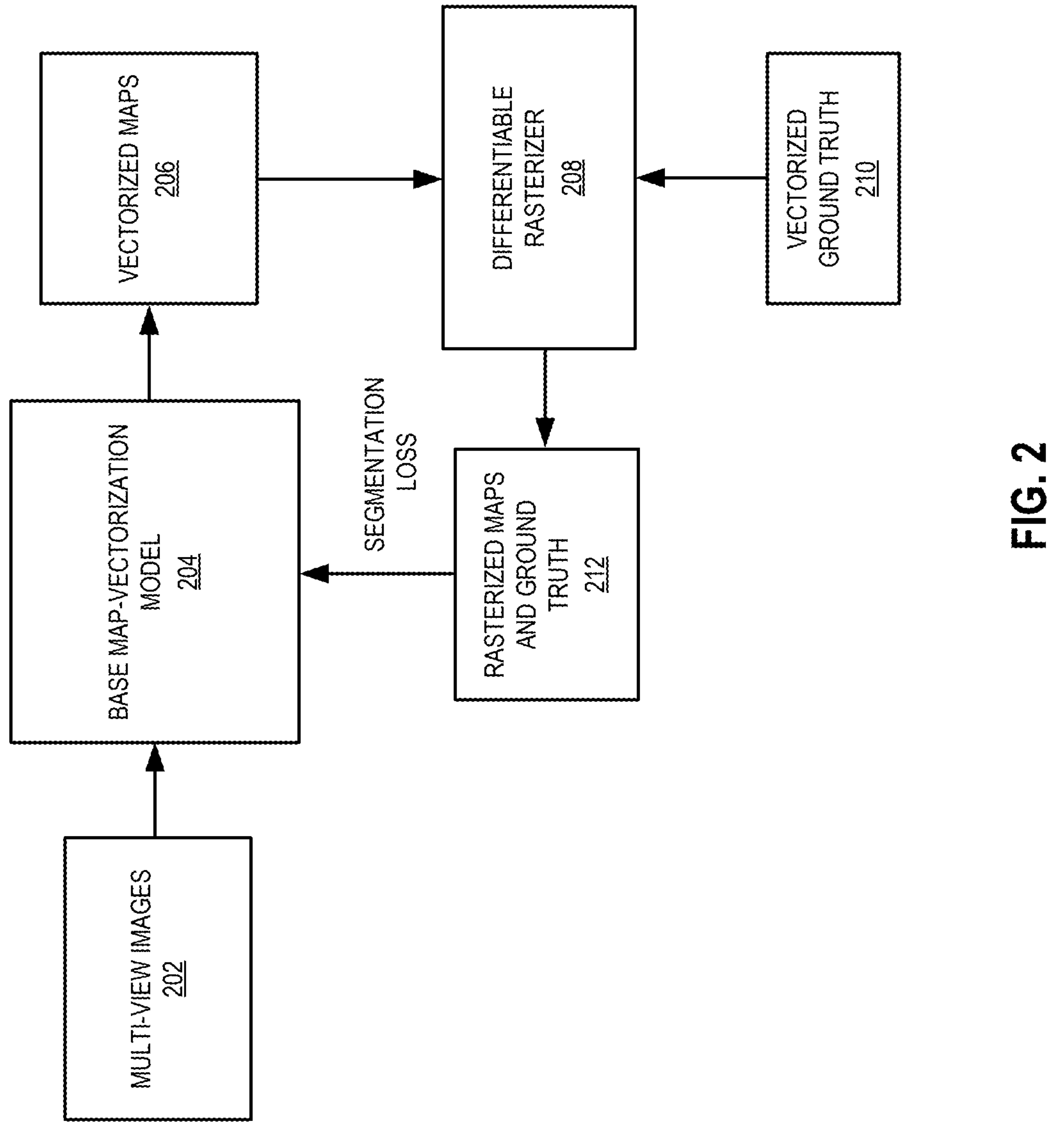
FIG. 2 illustrates an exemplary map vectorization via rasterization (MapVR) architecture, according to one embodiment of the instant application.

FIG. 2 illustrates an exemplary map vectorization via rasterization (MapVR) architecture, according to one embodiment of the instant application. In FIG. 2, multi-view images 202 can be sent to a base map-vectorization model 204, which can output vectorized maps 206. As discussed previously, each vectorized map element can be represented using a set of ordered points.

A differentiable rasterizer 208 can apply differentiable rasterization on vectorized maps 206 and vectorized ground truth 210 to generate rasterized maps and ground truth 212. Rasterization refers to the process of rendering vector graphic representations (e.g., point coordinates or mathematical formulas) into raster images (series of pixels) for display on computer screens. Due to the binary assignment that decides whether a pixel is covered by any shape primitive, conventional (or primitive) rasterization is nondifferentiable, which can limit the applications of the rasterized images (or maps). In some embodiments, differentiable rasterizer 208 can use a soft rasterization technique (e.g., replacing the hard step function at the edges with a soft function) to create rasterized maps. Examples of the soft function can include but are not limited to a sigmoid function, a function as a square root of logistic, and an exponential function.

In some embodiments, polylines and polygons may use different types of soft functions for differentiable rasterization. In one example, for a line-shaped map element represented by an ordered point set P, its softly rendered mask $I_{line}$ (x, y; P)$\in[0,1]^{H\times W}$ can be computed according to:

$$I_{line}(x, y; P) = \exp\left(-\frac{D(x, y; P)}{\tau}\right),$$

where I indicates the level of confidence that point (x, y) is in the foreground, D(x, y; P) denotes the closest distance from pixel (x, y) to all segments of the polyline P, and τ is the softness factor. In some embodiments, τ can be adjusted to control the rasterization smoothness. A larger τ yields smoother transitions between the polyline and empty regions, while a smaller t leads to sharper, more distinct line boundaries. In a different example, the softly rendered mask for a line can be computed according to:

$$I_{line}(x, y; P) = \sigma\left(\frac{-\log(D(x, y; P) + \epsilon)}{\tau}\right),$$

where ϵ is a small value. The negative exponential function or the sigmoid function ensures that the confidence level of a pixel in the segmentation mask decreases gradually with the increase of the distance between pixel (x, y) and the predicted polyline.

For a polygon-shaped map element (e.g., an intersection or a road path) represented by an ordered point set P, its softly rendered mask $I_{polygon}$ (x, y; P) can be computed according to:

$$I_{polygon}(x, y; P) = \sigma\left(\frac{C(x, y; P)\cdot D(x, y; P)}{\tau}\right),$$

where D(x, y; P) denotes the closest distance from pixel (x, y) to any boundary segment of the polygon P, C(x, y; P)$\in\{-1, +1\}$ are foreground/background indicators that indicate whether pixel (x, y) falls inside (i.e., C=+1 or in the foreground) or outside (i.e., C=−1 or in the background) of the polygon, and σ(·) denotes the sigmoid function. Similarly, the softness t controls the transition smoothness of the rasterized values at the polygon boundary areas. In different embodiments, the soft rasterization of both lines and polygons can be based on the same type of function (e.g., the sigmoid function). Other types of functions are also possible as long as they can demonstrate that the confidence levels of the pixels decrease gradually and smoothly away from the edges.

In addition to polylines and polygons, some map elements (e.g., traffic cones) may be represented using a single point, and differentiable rasterization can be similarly performed on the point-shaped map elements.

Differentiable rasterizer 208 can transform each vectorized map element into a rasterized mask representation in a parameter-free manner (meaning it makes no assumptions about the properties of the data), which enables the learning of fine-grained shapes and geometric details through direct supervision of these rasterized HD masks. More specifically, segmentation losses (e.g., Dice loss) can be applied to the rasterized masks to guide the learning of the vectorized predictions (i.e., the predictions made by base map-vectorization model 204).

The supervision of the learning of base map-vectorization model 204 can be geometry-aware, as the rasterization procedure (line-shaped or polygon-shaped rasterization) is determined by the class of the target map element. Moreover, the rasterization-based segmentation loss can effectively weigh down the equidistance requirement in conventional approaches, thus providing a more reasonable learning target.

In some embodiments, in addition to the segmentation loss, a direction regularization loss can be added as an additional auxiliary loss. Specifically, the direction regularization loss on the vectorized output can be defined as:

$$L_{dir} = \sum_{i=1}^{N-2} \frac{\langle \overrightarrow{P_iP_{i+1}}, \overrightarrow{P_{i+1}P_{i+2}} \rangle}{|\overrightarrow{P_iP_{i+1}}|\cdot|\overrightarrow{P_{i+1}P_{i+2}}|},$$

where $P_i$ denotes the $i_{th}$ point in the predicted point set. The direction regularization loss function is computed based on direction changes between adjacent pairs of points in the predicted set of ordered points. Each direction change increases the direction regularization loss. The direction regularization loss can encourage the predictions to avoid unnecessary direction changes along adjacent segments, thus effectively promoting a smoother point set to avoid back-and-forth patterns that are not penalized by the segmentation loss. The introduction of the direction regularization loss can also facilitate the allocation of more points in regions with higher curvature and fewer points in straight-line regions.

In another example, the training target of a predicted map element can include a set of ordered points with a predetermined number (e.g., 20) of permutation-invariant equidistant points as training targets, using L1 loss as a regularization loss. This loss term may be assigned a very small weight factor, as it only serves as a regularization and hint for the model to generate ordered point sets.

Figure 3:
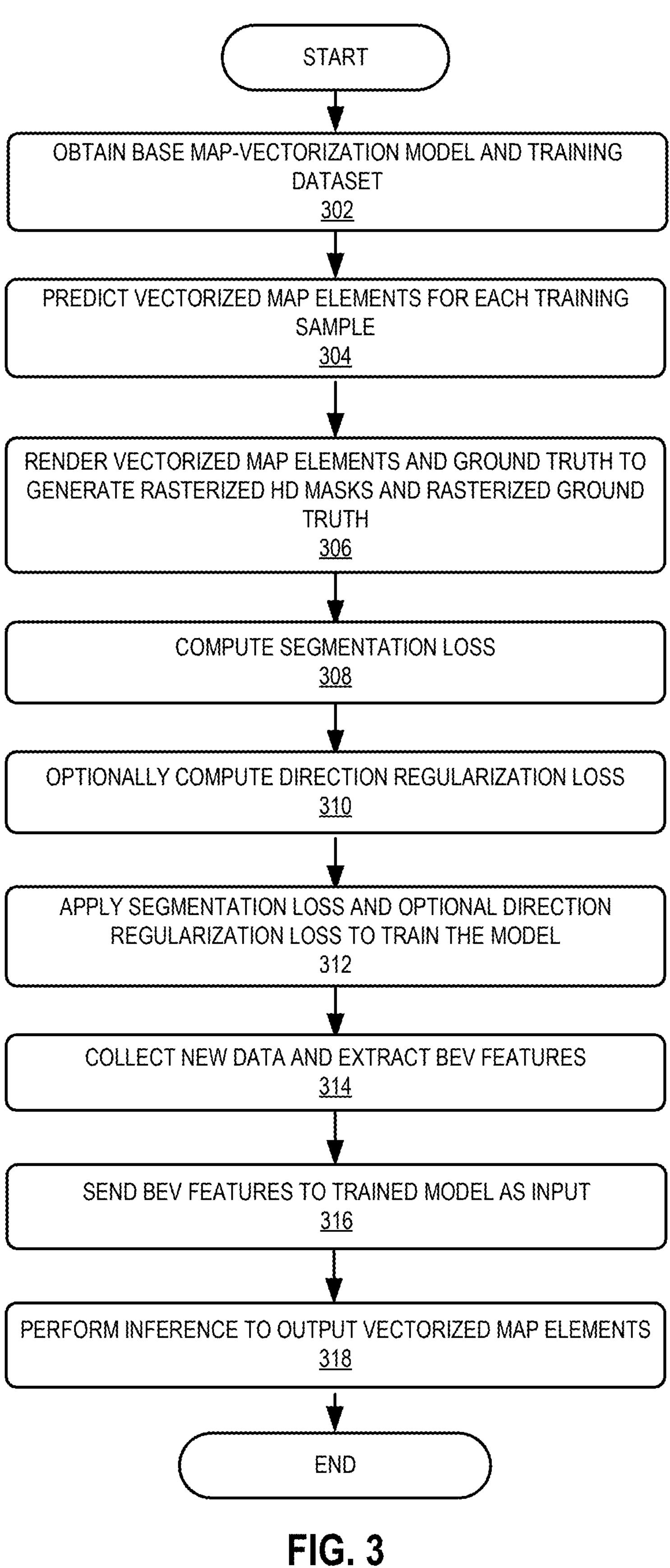
FIG. 3 presents a flowchart illustrating an exemplary map-vectorization process, according to one embodiment of the instant application.

FIG. 3 presents a flowchart illustrating an exemplary map-vectorization process, according to one embodiment of the instant application. During operation, the system can obtain a base map-vectorization model and a training dataset (operation 302). The base map-vectorization model can be an existing model for constructing vectorized maps, such as a transformer-based model like MapTR. The base map-vectorization model may have been previously trained according to conventional training techniques using equidistant points as training targets and L1 loss as training loss. In some embodiments, the training dataset can include labeled data representing various complex driving scenes in the real world. The training dataset can include a number of line-shaped classes (e.g., lanes, curbsides, stop lines, etc.) and a number of polygon-shaped classes (e.g., crosswalks, intersections, parking spaces, etc.). The training dataset can include multi-view images (e.g., BEV images) captured by cameras mounted at different locations of a vehicle. The label of each training sample can include ground truth information (e.g., vectorized ground truth map elements and their corresponding classes).

For each training sample (e.g., a set of BEV images corresponding to a traffic scene), the base map-vectorization model can generate an initial prediction of vectorized map elements (operation 304). Each vectorized map element can include a set of ordered points, which may represent a polyline or a polygon. In some embodiments, each ordered point set can include a predetermined number (e.g., 20 or 30) of ordered points, and each point may be expressed using its x-y coordinates. The prediction may also specify whether the map element is a polyline (e.g., a lane line or curbside) or a polygon (e.g., an intersection or a parking space). Note that even through the base map-vectorization model may have been trained previously, its initial prediction may still deviate from the ground truth. In alternative embodiments, the base map-vectorization model may be untrained.

The initial prediction (which can include vectorized map elements represented as polylines or polygons) and the vectorized ground truth can be rendered using a differentiable rasterization technique to generate corresponding rasterized HD masks and rasterized ground truth (operation 306). As discussed previously, depending on whether a map element is a polyline or a polygon, different rasterization approaches may be used. For example, an ordered point set P for a polyline can be rendered to generate an HD mask according to:

$$I_{line}(x, y; P) = \exp\left(-\frac{D(x, y; P)}{\tau}\right) \text{ or}$$

$$I_{line}(x, y; P) = \sigma\left(\frac{-\log(D(x, y; P) + \epsilon)}{\tau}\right),$$

whereas an ordered point set P for a polygon can be rendered to generate an HD mask according to $$I_{polygon}(x, y; P) = \sigma\left(\frac{C(x, y; P) \cdot D(x, y; P)}{\tau}\right).$$

Note that the softness factor t should be carefully selected such that it is large enough to provide sufficient supervisory gradient while being small enough to ensure precise supervision inference. In addition to the sigmoid and exponential functions, other functions can also be used to compute the segmentation masks. The rasterization resolution can also play an important role in improving the prediction accuracy of the model. A higher resolution can lead to more accurate predictions at the expense of more computational resources. In some embodiments, to ensure training efficiency, the forward and backward passes of the differentiable rasterizer can be implemented in CUDA (Compute Unified Device Architecture).

The segmentation loss can be computed based on the rasterized HD masks of the predicted map elements and the rasterized ground truth (operation 308). In some embodiments, Dice loss (which measures the similarity between two images) can be computed. The system can optionally compute the direction regularization loss for each predicted ordered point set (operation 310). In one example, the direction regularization loss can be computed according to $$L_{dir} = \sum_{i=1}^{N-2} \frac{\langle \overrightarrow{P_iP_{i+1}}, \overrightarrow{P_{i+1}P_{i+2}} \rangle}{|\overrightarrow{P_iP_{i+1}}| \cdot |\overrightarrow{P_{i+1}P_{i+2}}|},$$

which penalizes predictions with too many direction changes.

The system can apply the segmentation loss and the optional direction regularization loss on the map-vectorization model to train the model to make better predictions of vectorized map elements (operation 312). It has been shown that including the direction regularization loss during training can improve the performance of the map-vectorization model. In some embodiments, the map-vectorization model can be trained using a gradient-based optimization algorithm, such as Adaptive Moment Estimation (Adam). In further embodiments, the model can be trained by running a predetermined number of epochs (e.g., 24 or 30) using the training dataset.

Subsequent to the completion of the model training, new data (e.g., BEV images) can be collected, and BEV features can be extracted from the new data (operation 314). The extracted BEV features can be sent to the trained map-vectorization model as input (operation 316). The trained model can perform inference to output vectorized map elements in the form of ordered point sets (operation 318). Note that the inference process does not involve rasterization, meaning that the MapVR system can enhance map vectorization without adding any extra computational cost during inference. During inference, one query corresponds to one element in vectorized maps, meaning that the MapVR system has the potential to be deployed in real-time systems for ADAS and autonomous driving, which require fast and accurate perception of the environment.

Figure 4:
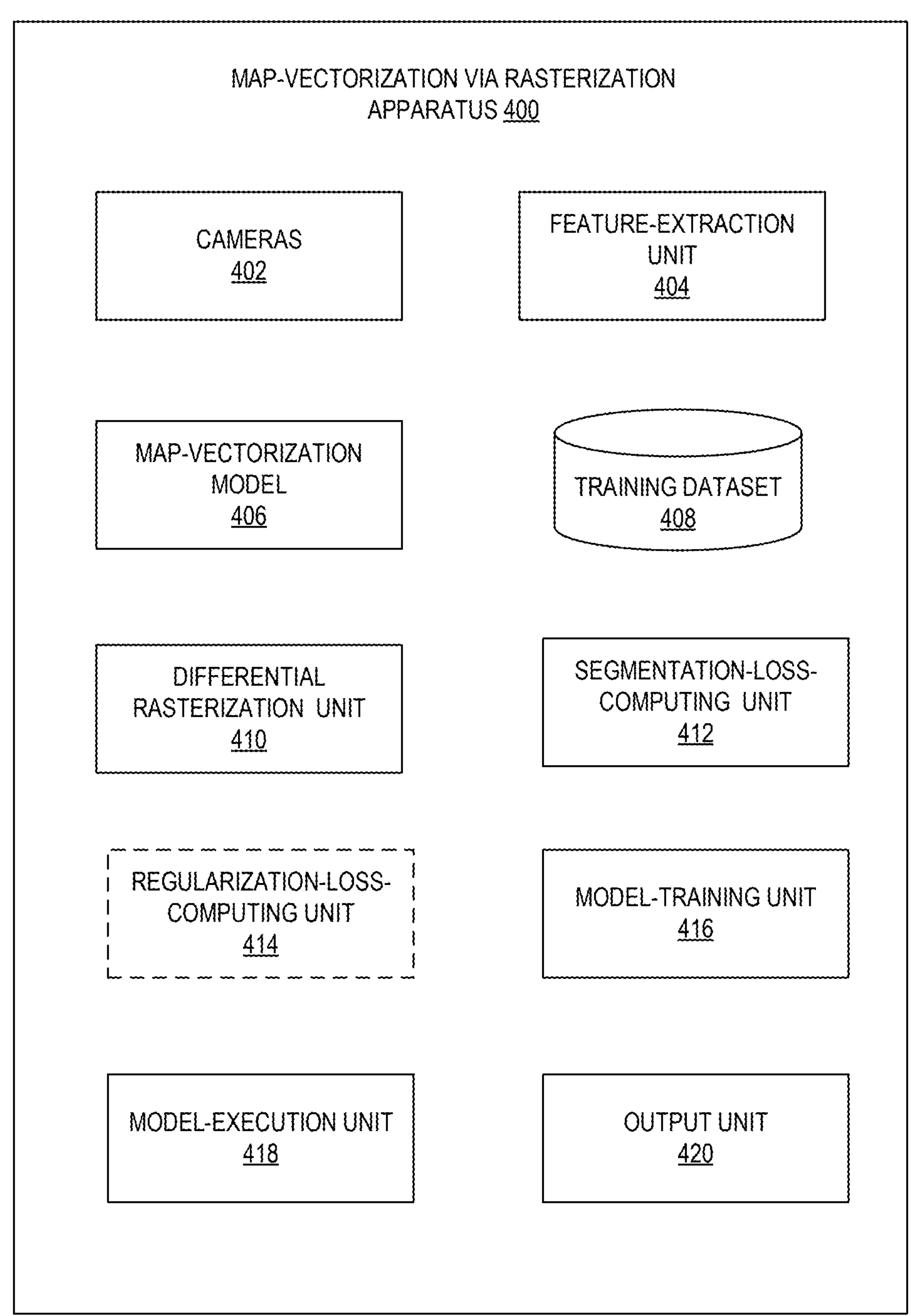
FIG. 4 illustrates the exemplary block diagram of a map-vectorization via rasterization (MapVR) apparatus, according to one embodiment of the instant application.

FIG. 4 illustrates the exemplary block diagram of a map-vectorization via rasterization (MapVR) apparatus, according to one embodiment of the instant application. MapVR apparatus 400 can include cameras 402, a feature-extraction unit 404, a map-vectorization model 406, a training dataset 408, a differentiable rasterization unit 410, a segmentation-loss-computing unit 412, an optional regularization-loss-computing unit 414, a model-training unit 416, a model-execution unit 418, and an output unit 420.

Cameras 402 can include on-vehicle cameras used for autonomous driving applications. Cameras 402 can include visible light and infrared (IR) cameras. In some embodiments, cameras 402 can be installed at different locations (e.g., front, back, and sides) of an ego vehicle. Cameras 402 can collect multi-view images of the environment surrounding the ego vehicle. Feature-extraction unit 404 can be responsible for extracting features from multi-view images captured by cameras 402. In one example, feature-extraction unit 404 can extract BEV features from the multi-view images.

Map-vectorization model 406 can include a deep-learning neural network that has been developed for constructing vectorized maps. In one example, map-vectorization model 406 can be based on the BEV framework, meaning it can predict vectorized map elements based on BEV images or features. In some embodiments, map-vectorization model 406 can include a residual neural network (ResNet), such as ResNet-50, which includes 48 convolutional layers, one MaxPool layer, and one average pool layer. Examples of map-vectorization model 406 can include transformer-based models, such as MapTR, HDMapNet, VectorMapNet, etc. In some embodiments, map-vectorization model 406 can include a model that has been previously trained using conventional training techniques to perform map-vectorization tasks.

Training dataset 408 can include labeled training samples representing various complex driving scenes in the real world. Training dataset 408 can include multi-view images (e.g., BEV images) with both line-shaped and polygon-shaped map elements. Each training sample can be labeled with vectorized ground truth information. For example, each map element can be associated with a set of ordered points (e.g., the x-y coordinates of points on a polyline or the edge of a polygon). During training, features extracted from the training samples can be sent to map-vectorization model 406, which can predict vectorized map elements based on the extracted features.

Differentiable rasterization unit 410 can be responsible for rendering the predicted vectorized map elements as well as the vectorized ground truth. More specifically, differentiable rasterization unit 410 can compute a segmentation mask for a polyline-shaped vectorized map element according to an exponential function (i.e., $$I_{line}(x, y; P) = \exp\left(-\frac{D(x, y; P)}{\tau}\right)\Big)$$

or a sigmoid function $$\left(\text{e.g., } I_{line}(x, y; P) = \sigma\left(\frac{-\log(D(x, y; P) + \epsilon)}{\tau}\right)\right).$$

Differentiable rasterization unit 410 can compute a segmentation mask for a polygon-shaped vectorized map element according to a sigmoid function (e.g., $$I_{polygon}(x, y; P) = \sigma\left(\frac{C(x, y; P) \cdot D(x, y; P)}{\tau}\right)\Big).$$

Other functions may also be used for the computation of the segmentation mask as long as they can describe the "soft" transition between the foreground and background of the segmented image.

Segmentation-loss-computing unit 412 can be responsible for computing the segmentation loss based on the rendered masks of the predicted vectorized map and the vectorized ground truth. In one embodiment, during each training iteration, segmentation-loss-computing unit 412 can compute a Dice-coefficient loss function (or Dice loss for short). Segmentation-loss-computing unit 412 may also compute other types of loss functions, such as the cross-entropy loss function. Regularization-loss-computing unit 414 can be optional and can be used to compute one or more regularization loss functions, such as a direction regularization loss function that penalizes unnecessary direction changes along adjacent segments of a vectorized map element.

Model-training unit 416 can be responsible for training the map-vectorization model using the segmentation loss and the optional direction regularization loss. In some embodiments, the model can be trained for a predetermined number (e.g., 24 or 30) of epochs using training dataset 408.

Model-execution unit 418 can execute the trained model to process new data. More specifically, BEV features extracted from multi-view images captured by cameras 402 can be used as input to the trained model, which can generate a predicted vectorized map. Output unit 420 can output the predicted vectorized map to downstream navigation and decision-making modules. Note that MapVR apparatus 400 can serve as the prediction head compatible with many perception models, such as BEV perception models like BEVFormer.

Figure 5:
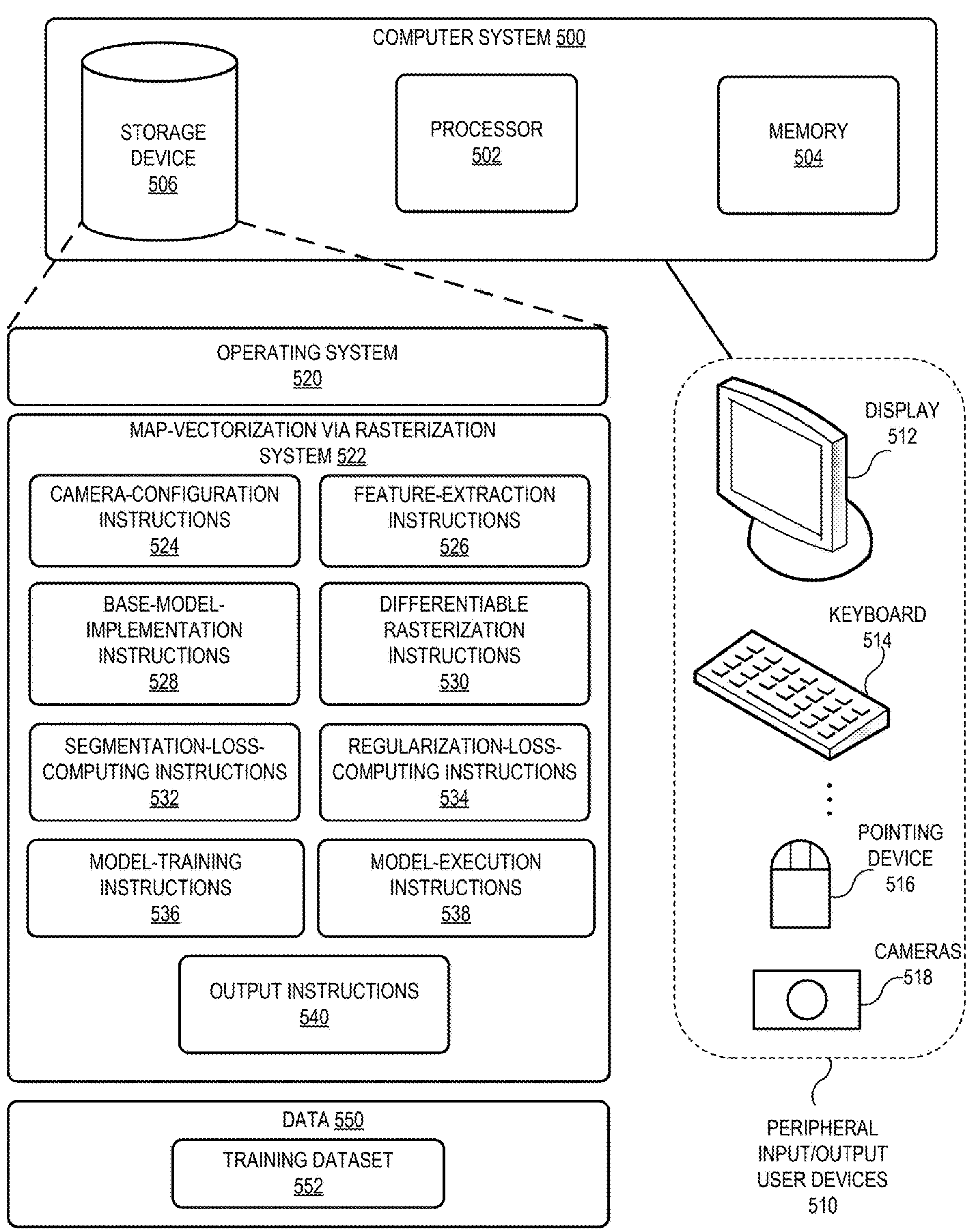
FIG. 5 illustrates an exemplary computer system for performing map vectorization, according to one embodiment of the instant application.

FIG. 5 illustrates an exemplary computer system for performing map vectorization, according to one embodiment of the instant application. Computer system 500 includes a processor 502, a memory 504, and a storage device 506. Furthermore, computer system 500 can be coupled to peripheral input/output (I/O) user devices 510, e.g., a display device 512, a keyboard 514, a pointing device 516, and cameras 518. Storage device 506 can store an operating system 520, a map-vectorization via rasterization (MapVR) system 522, and data 550. In some embodiments, computer system 500 can be implemented as part of an advanced driver-assistance system (ADAS) or an automated driving system (ADS) installed on a vehicle.

MapVR system 522 can include instructions, which when executed by computer system 500, can cause computer system 500 or processor 502 to perform methods and/or processes described in this disclosure. Specifically, MapVR system 522 can include instructions for configuring multiple cameras to capture multi-view images (camera-configuration instructions 524), instructions for extracting BEV features from the multi-view images (feature-extraction instructions 526), instructions for implementing a base map-vectorization model to output initial predictions (base-model-implementation instructions 528), instructions for applying differentiable rasterization on both the vectorized map elements predicted by the base map-vectorization model and the vectorized ground truth (differentiable rasterization instructions 530), instructions for computing a segmentation loss function (segmentation-loss-computing instructions 532), instructions for computing a direction regularization loss function (regularization-loss-computing instructions 534), instructions for training the map-vectorization model under the guidance of the segmentation loss and optionally the direction regularization loss (model-training instructions 536), instructions for executing the trained map-vectorization model to process new data (model-execution instructions 538), and instructions for outputting the prediction of vectorized map elements (output instructions 540). Data 550 can include a training dataset 552.

In general, this disclosure describes a system and method for rasterization-enhanced map vectorization. More specifically, the disclosed map-vectorization solution can improve the performance of existing map-vectorization approaches or models by combining differentiable rasterization to leverage the fine-grained supervisory signal from rasterized HD maps while retaining the benefit of vectorized representation of the model output. During supervised training, a base map-vectorization model can receive labeled training samples and predict vectorized map elements in each sample. Differentiable rasterization techniques can be applied to the predicted vectorized map elements as well as the vectorized ground truth. The rendering or rasterization of a vectorized map element can be based on different soft functions depending on the type of the map element. Segmentation loss (e.g., a Dice-coefficient loss function) can be computed based on the rasterized HD map and the rasterized ground truth. A direction regularization loss term can also be optionally computed. The map-vectorization model can then be trained based on the segmentation loss and the optional direction regularization loss. The trained map-vectorization model can then be used to construct vectorized maps based on new data (e.g., multi-view images collected by on-vehicle cameras). The prediction output can be used by perception and decision-making modules in ADAS or autonomous driving systems.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices, solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the optimized parameters from the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processes included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A computer-implemented method for generating vectorized maps, the method comprising:

obtaining labeled training samples comprising images and vectorized ground truth information associated with the images;

generating, based on a machine learning model, a prediction output for each training sample, the prediction output comprising a vectorized map;

applying a differentiable rasterization technique to a vectorized map element within the vectorized map to obtain a segmentation mask; and applying the differentiable rasterization technique to the vectorized ground truth information associated with the vectorized map element to obtain a ground truth segmentation mask;

computing a segmentation loss function based on the segmentation mask and the ground truth segmentation mask; and updating the machine learning model based on the segmentation loss function, thereby facilitating optimized generation of vectorized maps.

2. The method of claim 1, wherein the images comprise multi-view images captured by multiple cameras mounted at different locations on a vehicle.

3. The method of claim 2, further comprising extracting Bird's Eye View (BEV) features from the multi-view images.

4. The method of claim 1, wherein the machine learning model comprises a map-vectorization model based on a residual neural network (ResNet).

5. The method of claim 1, wherein applying the differentiable rasterization technique to the vectorized map element further comprises:

in response to determining that the vectorized map element is a polyline, computing the segmentation mask based on an exponential or sigmoid function associated with distances between pixels and the polyline.

6. The method of claim 1, wherein applying the differentiable rasterization technique to the vectorized map element further comprises:

in response to determining that the vectorized map element is a polygon, computing the segmentation mask based on a sigmoid function associated with distances between pixels and an edge of the polygon and foreground-background indicators of the pixels.

7. The method of claim 1, wherein applying the differentiable rasterization technique further comprises adjusting a softness factor to control smoothness of the differentiable rasterization.

8. The method of claim 1, wherein the vectorized map element comprises a set of ordered points.

9. The method of claim 8, further comprising computing a direction regularization loss function based on direction changes between adjacent pairs of points in the set of ordered points.

10. A computing system, comprising:

a processor; and a memory coupled to the processor and storing instructions that when executed by the processor cause the processor to perform a method for training a machine learning model to generate vectorized maps for autonomous driving, the method comprising:

obtaining labeled training samples comprising images and vectorized ground truth information associated with the images;

generating, based on a machine learning model, a prediction output for each training sample, the prediction output comprising a vectorized map;

applying a differentiable rasterization technique to a vectorized map element within the vectorized map to obtain a segmentation mask; and applying the differentiable rasterization technique to the vectorized ground truth information associated with the vectorized map element to obtain a ground truth segmentation mask;

computing a segmentation loss function based on the segmentation mask and the ground truth segmentation mask; and updating the machine learning model based on the segmentation loss function, thereby facilitating optimized generation of vectorized maps.

11. The computing system of claim 10, wherein the images comprise multi-view images captured by multiple cameras mounted at different locations on a vehicle.

12. The computing system of claim 11, wherein the method further comprises extracting Bird's Eye View (BEV) features from the multi-view images.

13. The computing system of claim 10, wherein the machine learning model comprises a map-vectorization model based on a residual neural network (ResNet).

14. The computing system of claim 10, wherein applying the differentiable rasterization technique further comprises:

in response to determining that the vectorized map element is a polyline, computing the segmentation mask based on an exponential or sigmoid function associated with distances between pixels and the polyline.

15. The computing system of claim 10, wherein applying the differentiable rasterization technique to the vectorized map element further comprises:

in response to determining that the vectorized map element is a polygon, computing the segmentation mask based on a sigmoid function associated with distances between pixels and an edge of the polygon and foreground-background indicators of the pixels.

16. The computing system of claim 10, wherein applying the differentiable rasterization technique to the vectorized map element further comprises adjusting a softness factor to control smoothness of the differentiable rasterization.

17. The computing system of claim 10, wherein the vectorized map element comprises a set of ordered points.

18. The computing system of claim 17, wherein the method further comprises computing a direction regularization loss function based on direction changes between adjacent pairs of points in the set of ordered points.

19. A non-transitory computer-readable storage medium storing instructions that when executed by a computer cause the computer to perform a method for generating vectorized maps:

obtaining labeled training samples comprising images and vectorized ground truth information associated with the images;

generating, based on a machine learning model, a prediction output for each training sample, the prediction output comprising a vectorized map;

applying a differentiable rasterization technique to a vectorized map element within the vectorized map to obtain a segmentation mask; and applying the differentiable rasterization technique to the vectorized ground truth information associated with the vectorized map element to obtain a ground truth segmentation mask;

computing a segmentation loss function based on the segmentation mask and the ground truth segmentation mask; and updating the machine learning model based on the segmentation loss function, thereby facilitating optimized generation of vectorized maps.

20. The non-transitory computer-readable storage medium of claim 19, wherein applying the differentiable rasterization technique to the vectorized map element further comprises:

in response to determining that the vectorized map element is a polyline, computing the segmentation mask based on an exponential or sigmoid function associated with distances between pixels and the polyline; and in response to determining that the vectorized map element is a polygon, computing the segmentation mask based on a sigmoid function associated with distances between pixels and an edge of the polygon and foreground-background indicators of the pixels.

* * * * *